United States Patent
Monogioudis

(10) Patent No.: US 8,630,652 B2
(45) Date of Patent: Jan. 14, 2014

(54) METHOD AND APPARATUS FOR OPTIMIZING THE LOCATION OF HETEROGENEOUS UNDERLAID EVOLVED NODE-BS

(75) Inventor: Pantelis Monogioudis, Randolph, NJ (US)

(73) Assignee: Alcatel Lucent, Paris (FR)

( * ) Notice: Subject to any disclaimer, the term of this patent is extended or adjusted under 35 U.S.C. 154(b) by 369 days.

(21) Appl. No.: 12/915,261

(22) Filed: Oct. 29, 2010

(65) Prior Publication Data

US 2012/0108246 A1 May 3, 2012

(51) Int. Cl.
*H04W 40/00* (2009.01)
*H04W 4/00* (2009.01)
*H04M 11/00* (2006.01)

(52) U.S. Cl.
USPC ........ 455/446; 455/405; 455/422.1; 455/447; 455/448; 455/449

(58) Field of Classification Search
USPC ..................... 455/422.1, 446–449
See application file for complete search history.

(56) References Cited

U.S. PATENT DOCUMENTS

| | | | |
|---|---|---|---|
| 6,094,580 A * | 7/2000 | Yu et al. ................. | 455/446 |
| 6,336,035 B1 * | 1/2002 | Somoza et al. .......... | 455/446 |
| 2003/0109257 A1 * | 6/2003 | Nilsson et al. .......... | 455/436 |
| 2004/0127224 A1 * | 7/2004 | Furukawa et al. ....... | 455/446 |
| 2006/0128372 A1 * | 6/2006 | Gazzola ................. | 455/424 |
| 2008/0085714 A1 * | 4/2008 | Biby ..................... | 455/446 |

* cited by examiner

*Primary Examiner* — Jean Gelin
*Assistant Examiner* — Dung Hong
(74) *Attorney, Agent, or Firm* — Harness, Dickey & Pierce

(57) ABSTRACT

In one embodiment, mobile device traffic information and signal strength information associated with a geographical region are obtained. A plurality of candidate locations are determined based on the traffic information and the signal strength information, capacity values for each of the candidate locations are determined, and a candidate location is selected, from among the plurality of candidate locations, as a placement locations based on the capacity values.

17 Claims, 10 Drawing Sheets

METHOD AND APPARATUS FOR OPTIMIZING THE LOCATION OF HETEROGENEOUS UNDERLAID EVOLVED NODE-BS

BACKGROUND OF THE INVENTION

1. Field

The present invention relates generally to underlaid pico base stations and in particular to a method for determining placement locations for underlaid pico BSs.

2. Related Art

Heterogeneous wireless networks include macro base stations (BSs) and pico base stations BSs. Macro base stations provide wireless coverage for user equipment (UEs) within large geographical areas, while pico BSs may be underlaid with respect to the macro BSs in order to provide wireless coverage for UEs located in smaller geographical areas within the coverage are of a macro BS.

Pico BSs may affect the quality of service experienced by users of a heterogeneous wireless network by providing supplemental support for UEs within portions of the geographical area covered by the macro BS where pico BSs are placed.

SUMMARY OF THE INVENTION

One or more embodiments relate to a method of determining one or more locations within a geographical region for deploying a network element of a communications network.

According to at least one example embodiment, a method for determining one or more locations within a geographical region for deploying a network element of a communications network includes obtaining mobile device traffic information associated with the geographical region; obtaining signal strength information associated with the geographical region; determining a plurality of candidate locations based on the traffic information and the signal strength information, using a network planning tool; determining capacity values for each of the candidate locations, using the network planning tool; and selecting a candidate location, from among the plurality of candidate locations, as a placement location based on the capacity values, using the network planning tool.

The signal strength information may be a signal to interference and noise ratio (SINR) map.

The traffic information may be a traffic intensity (TI) map.

Determining the plurality of candidate locations may include applying a clustering algorithm to the signal strength information to generate a first set of locations, applying a clustering algorithm to the traffic information to generate a second set of locations, and selecting the plurality of candidate locations based on the first and second generated sets of locations.

Selecting the plurality of candidate locations based on the first and second generated sets of locations may include determining a plurality of distance values based on Euclidean distances between each of the first set of generated location values, and each of the second set of generated location values, and selecting, as the plurality of locations values, location values from among the first and second sets of generated location values based on the plurality of distance values.

Determining capacity values for each of the candidate locations may include determining post selection SINR values corresponding to each of the candidate locations.

Each of the post selection SINR values may be based on an estimated number of mobile devices which will connect to a network element that is placed at the candidate location corresponding to the SINR value.

The estimated number of mobile devices may be determined based on the traffic information and a bias value, the bias value being a value which controls the likelihood with which a mobile device that is in a portion of the geographical region within a coverage area of a macro base station and a pico base station, will connect to the pico base station.

Selecting a candidate location, from among the plurality of candidate locations, as a placement locations based on the capacity values may include choosing the candidate location, form among the plurality of candidate locations, having the highest associated pull-in capacity, and comparing the pull-in capacity value associated with the chosen candidate location with a threshold capacity value.

The threshold capacity value is a percentage of a maximum throughput that can be achieved by the network element if the network element is placed at the chosen candidate location.

Determining capacity values for each of the candidate locations may include determining, for each candidate location, a plurality of potential capacity values, each of the plurality of potential capacity values corresponding to a different one of a plurality of potential bias values.

Selecting a candidate location, from among the plurality of candidate locations, as a placement locations based on the capacity values may include choosing the candidate location, from among the plurality of candidate locations, having the highest associated pull-in capacity.

Selecting a candidate location, from among the plurality of candidate locations, as a placement locations based on the capacity values may further include choosing the candidate location, from among the plurality of candidate locations, having the highest associated pull-in capacity, from among each pull-in capacity in each plurality of potential capacity values corresponding to each of the plurality of candidate locations.

According to another example embodiment, a network planning device configured to determine one or more locations within a geographical region for deploying a network element of a communications network may include a processor, a data bus; and a memory unit connected to the processor through the data bus, the memory storing instructions configured to cause the processor to obtain mobile device traffic information associated with the geographical region, obtain signal strength information associated with the geographical region, determine a plurality of candidate locations based on the traffic information and the signal strength information, determine capacity values for each of the candidate locations, and select a candidate location, from among the plurality of candidate locations, as a placement location for the network element based on the capacity values.

The signal strength information may be a signal to interference and noise ratio (SINR) map.

The traffic information may be a traffic intensity (TI) map.

The instructions may be configured to cause the processor to determine the plurality of candidate locations by applying a clustering algorithm to the signal strength information to generate a first set of locations, applying a clustering algorithm to the traffic information to generate a second set of locations, and selecting the plurality of candidate locations based on the first and second generated sets of locations.

The instructions may be configured to cause the processor to select the plurality of candidate locations based on the first and second generated sets of locations by determining a plurality of distance values based on Euclidean distances between each of the first set of generated location values, and each of the second set of generated location values, and selecting, as the plurality of locations values, location values from among the first and second sets of generated location values based on the plurality of distance values.

The determining capacity values for each of the candidate locations may include determining post selection SINR values corresponding to each of the candidate locations.

The network element may be a pico base station that is underlaid with respect to a macro base station in the geographical region.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1A:
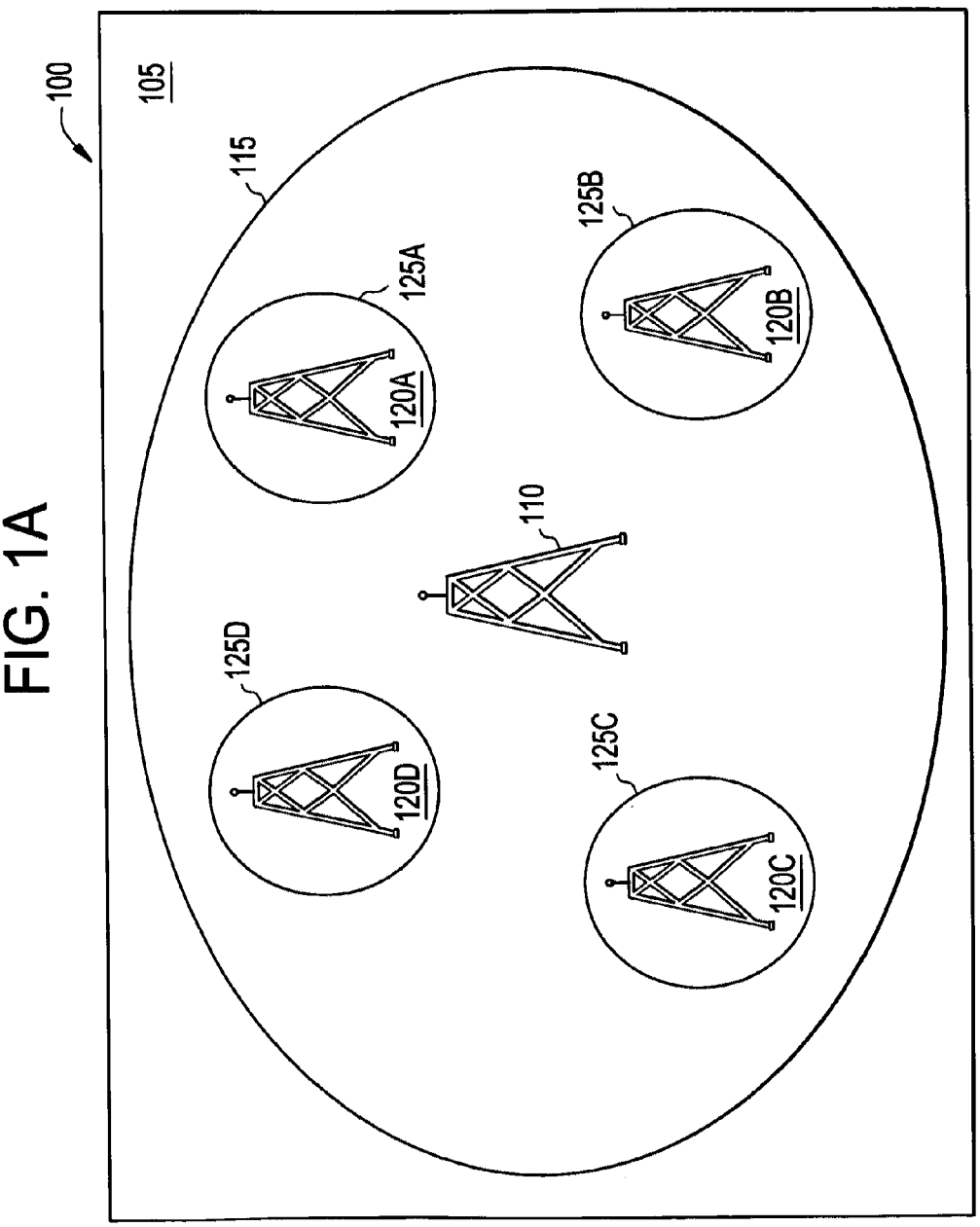
FIG. 1A illustrates a portion of a communications network

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE), may be considered synonymous to, and may hereafter be occasionally referred to, as a access terminal, terminal, mobile, mobile unit, mobile station, mobile user, subscriber, user, remote station, receiver, etc., and may describe a remote user of wireless resources in a wireless communication network. The term base station BS may be considered synonymous to and/ or referred to as a base transceiver station (BTS), NodeB, evolved Node B, femto cell, access point, etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types. The program modules and functional processes discussed herein may be implemented using existing hardware including one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

FIG. 1A illustrates a portion of a communications network 100 associated with a geographical region 105. Referring to FIG. 1A, communications network 100 may follow, for example, an LTE protocol. Communications network 100 includes a macro base station (BS) 110; a plurality of pico BSs 120A-D; and a UE 130. Though, for the purpose of simplicity, communications network 110 is illustrated as having only macro BS 110; pico BSs 120A-D; and UE 130, communications network 100 may have any number of macro BSs, pico BSs and UEs. The macro BS 110 and pico BSs 120A-D may be connected to, for example, one or more mobility management entities (MME) (not shown) included in the communications network 100.

The macro BS 110 may be, for example, an evolved node B (eNB) providing wireless coverage for mobiles within a coverage area 115. Pico BSs 120A-D may be, for example, eNBs underlaid with respect to the macro BS 110.

The underlaid pico BSs 120A-D provide wireless coverage for mobiles within coverage areas 125A-D that supplements coverage provided by the macro BS 110. UEs, like the UE 130, within both the coverage area 115 of the macro BS 110 and one of the coverage areas 125A-D of pico BSs 120A-D may be in communication with the communications network 100 via a wireless connection to either the macro BS 110 or one of the pico BSs 120A-D.

Signal strength and mobile traffic conditions may very greatly between different areas within the coverage area 115 of the macro BS 110 due to a number of factors including, location and/or height of buildings, high numbers of UEs in certain areas compared to others, etc. It would be advantageous to place pico BSs 120A-D strategically in locations within the coverage area of the macro BS 110 that would maximize the overall efficiency of the portion of the communication network 100 associated with the geographical region 105. A process for facilitating the strategic placement of pico BSs will be discussed in greater detail below with reference to FIG. 2.

Overview of Pico BS Placement Location Identifying Method and Apparatus

Figure 1B:
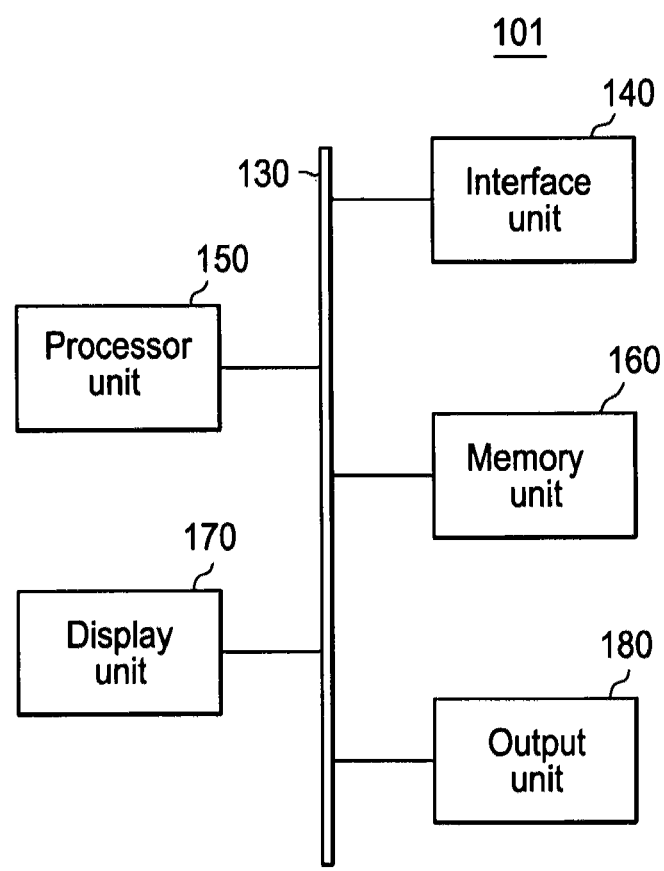
FIG. 1B is a diagram illustrating an example of a network planning device

FIG. 1B is a diagram illustrating an example of a network planning device 101. Referring to FIG. 1B, the network planning device 101 may include, for example, a data bus 130, an interface unit 140, a processor 150, a memory unit 160, a display 170, and an output unit 180. The interface unit 140, processor unit 150, memory unit 160, display unit 170, and an output unit 180 may send a receive data to one another using the data bus 130. The interface unit 140 is device that includes the necessary hardware and/or software for receiving data including, for example, signal strength data and traffic intensity data, via one or more wired and/or wireless connections to one or more external data sources. The processor 150 may be, for example, a microprocessor capable of executing instructions included in computer readable code. The memory unit 160 may be any device capable of storing data including magnetic storage, flash storage, or the like. The display 170 may be any device capable of displaying data including, for example, a computer monitor, a PDA display, or the like. The output unit 180 may be any device capable of outputting data. An example method for operating the network planning device 101 will be discussed in greater detail below with reference to FIG. 2.

Figure 2:
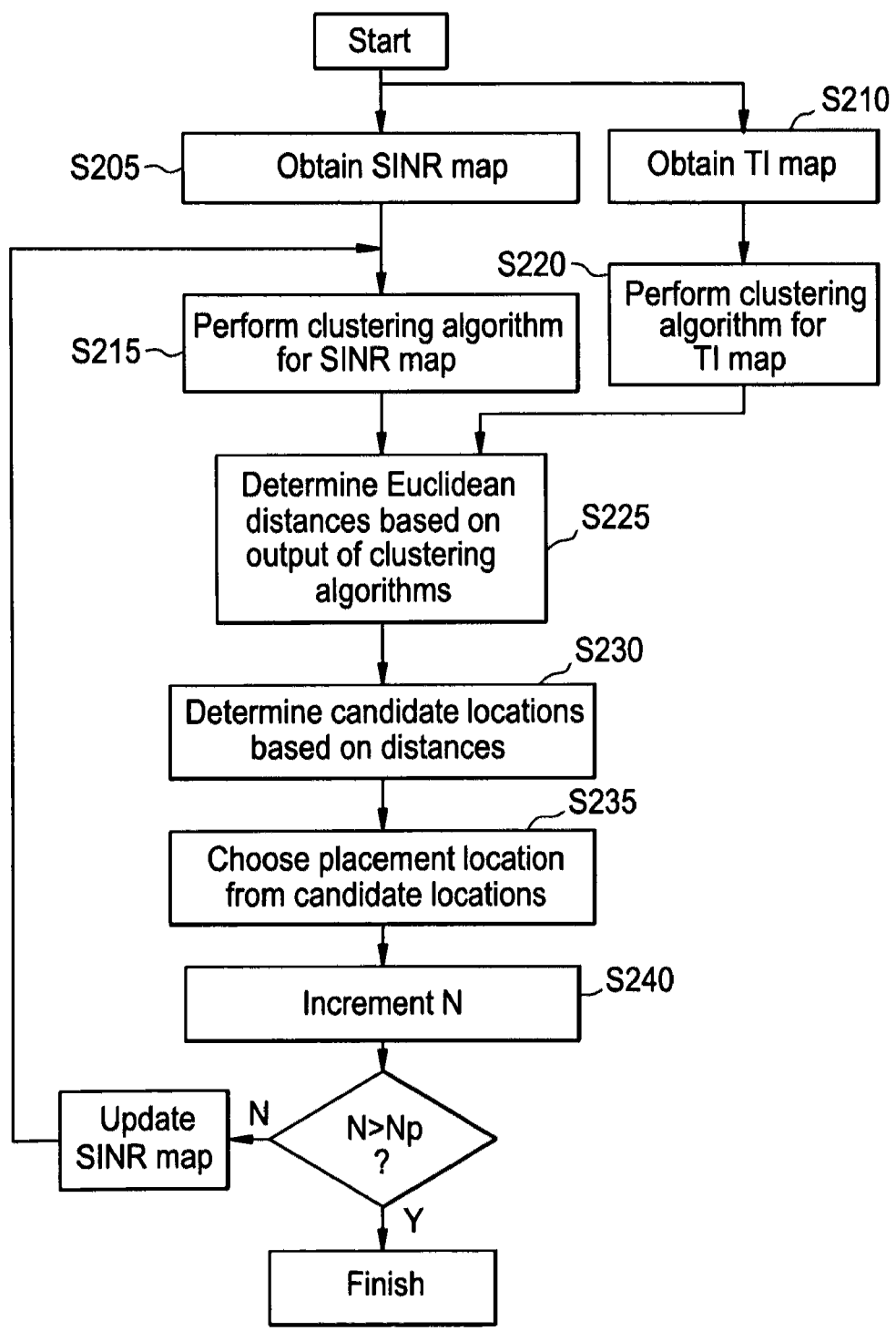
FIG. 2 is a flow chart illustrating an example method for determining a location within a geographical region for deploying one or more pico BSs according to example embodiments.

FIG. 2 is a flow chart illustrating an example method for determining a location within a geographical region for deploying one or more pico BSs according to example embodiments. The pico BS placement location identifying method according to example embodiments of the present invention uses signal strength and traffic information in order to make intelligent decisions with respect to placement of pico BSs in a manner that increases or maximizes the overall efficiency of a communications network as well as the service quality experienced by UEs within the network. The pico BS placement location identifying method according to example embodiments of the present invention will be discussed below with reference to FIG. 2 in terms of four main components: 1) obtaining signal strength information, which will be discussed below with reference to step S205; 2) obtaining traffic information, which will be discussed with reference to step S210; 3) determining candidate pico BS locations, which will be discussed with reference to steps S215-S230; and 4) choosing a placement location from among the candidate locations, which will be discussed with reference to step S235.

According to example embodiments, each of steps illustrated in FIG. 2 may be performed by, for example, the network planning device 101, where the memory unit 160 stores executable instructions corresponding to each of the steps illustrated in FIG. 2, and the processor unit 150 performs operations corresponding to each of the steps illustrated in FIG. 2. According to example embodiments, received data, including signal strength and traffic intensity information, may be received through the interface unit 140, and data produced as a result of performing the steps illustrated in FIG. 2 may be output to an external entity via the output unit 180 and/or displayed on the display unit 170.

Further, the steps illustrated in FIG. 2 may be embodied in the form of computer code stored in a computer readable medium including, for example, an optical disc. The computer code includes instructions capable of causing a computer to perform operations corresponding to the steps illustrated in FIG. 2.

Figure 3:
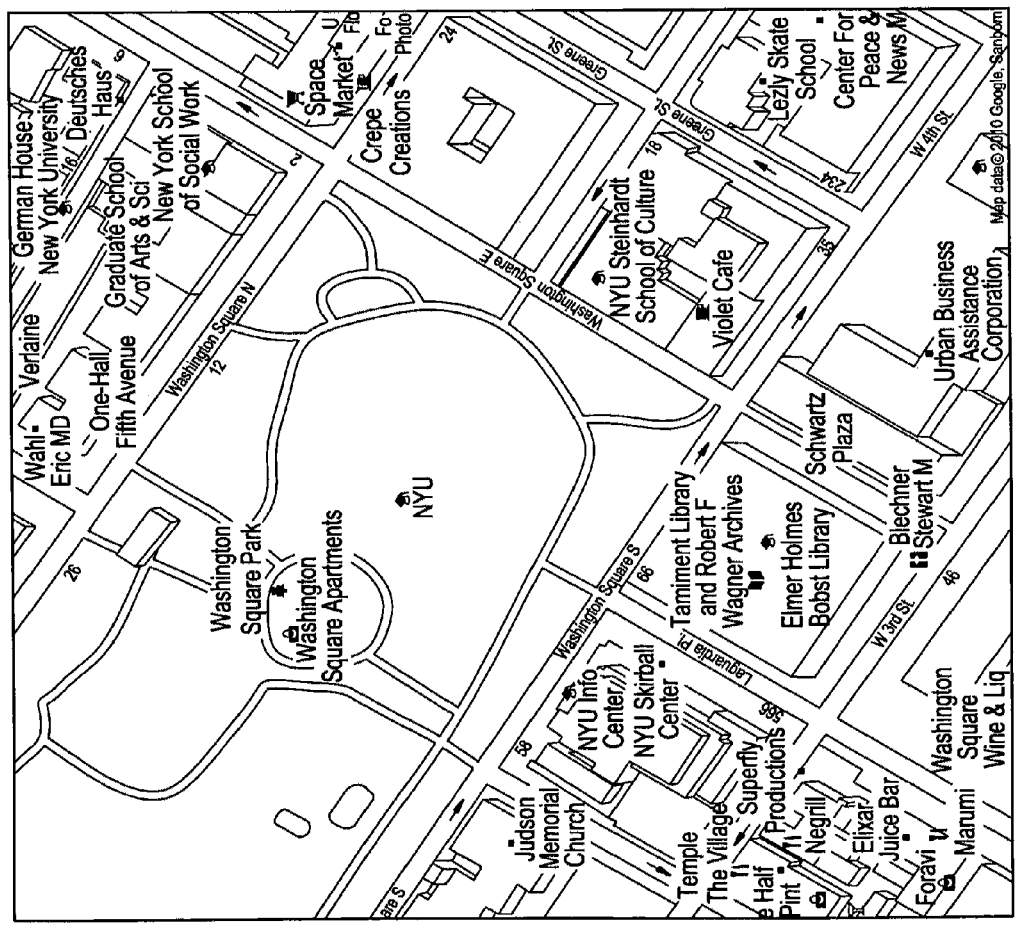
FIG. 3 illustrates a map of a portion of a geographical region.

FIG. 3 illustrates a map of a portion of a geographical region 300. Geographical region 300 is an example of a region upon which pico BSs may be placed at locations chosen by the pico BS placement location identifying method according to example embodiments of the present invention. The example method illustrated in FIG. 2 will now be explained below with reference to the geographical region 300 illustrated in FIG. 3. It will be assumed that the geographical region 300 includes one or more macro BSs, and the example method illustrated in FIG. 2 is being used to determine $N_p$ desirable or optimal locations for placing pico BSs within the geographical region 300.

Signal Strength Information

Referring to FIG. 2, in step S205, signal strength information associated with the geographical region 300 is obtained. The signal strength information may be, for example, a signal to noise and interference ratio (SINR) map. The SINR map may be constructed based on a regional map like the map of the geographical region 300 illustrated in FIG. 3 using, for example, any known radio network planning (RNP) tool.

Figure 4:
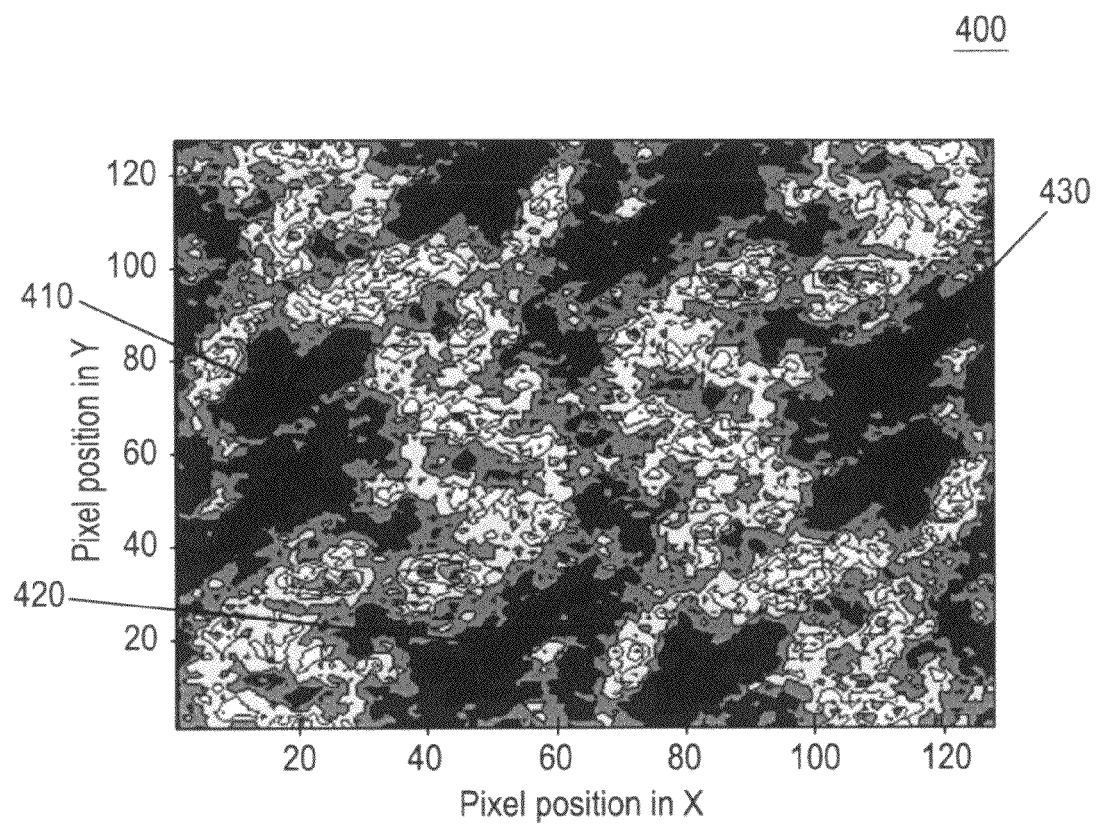
FIG. 4 illustrates an example of a signal to interference and noise ratio (SINR) map.

FIG. 4 illustrates an example of a SINR map 400. Prior to actually placing underlaid pico BSs in the geographical region 300, the geographical region 300 is already covered by overlaid macro BSs. The transmitted radio signals are propagated through the mobile channel that is characterized by path loss and long-term fading also known as lognormal shadowing that is due to the buildings and other structures. The downlink (DL) SINR quantity can be estimated given the locations of the macro BSs for each grid point of the clutter. Statistical as well as deterministic methods of estimating the losses that are applied to the signal and interference are known. The statistical methods are based on, for example, the Hata and Gudmudson models while the deterministic methods are based on, for example, ray tracing methods.

The end result of the SINR estimation is a SINR map, like that illustrated in FIG. 4, which represents the SINR quantity as experienced by hypothetical UEs placed at every grid point of the area when they receive DL signals from the overlaid macro BSs only. The grid width may be, for example, 10 m for urban areas. Referring to FIG. 4, the example SINR map illustrated in FIG. 4 is an example of a 128×128 macro BS SINR map that can be generated in the manner discussed above. As is shown in FIG. 4, the SINR map 400 has lognormal-like spatial variability as is illustrated by the low-SINR "valleys" 410, 420 and 430. The valleys 410, 420 and 430 indicate areas where it may be advantageous to place pico BSs in order to raise the lowered SINR values.

Each SINR calculation from the RNP can be based on, for example, either the control region of the LTE spectrum or the physical downlink shared channel (PDSCH) allocation according to known methods. The former is given by, for example, equation (1) below:

$$\text{SINR at every grid point} = RSRQ/[1-RSRQ] \quad (1)$$

where the reference signal received quality (RSRQ) is the ratio of the reference signal received power (RSRP) and the total power spectral density (PSD) (Io) at the antenna connector of the terminal. Note that SINR quantities for PDSCH are not static and they vary depending on the PSD of the interfering cells. However, the SINR values of interest with respect to step S205 are average quantities that will depend on the path loss and shadowing quantities as well as network loading only and not on transmission time interval (TTI)-to-TTI variability.

In addition to obtaining signal strength information, UE traffic information is also obtained as will now be discussed in greater detail below.

Traffic Information

Referring again to FIG. 2, in step S210, UE traffic information associated with the geographical region 300 is obtained. The traffic information obtained in step S210 may be represented as, for example, a traffic intensity (TI) map indicating the concentration of UE traffic in the spatial domain. The TI map can be used as information, in addition to the information provided by the SINR map obtained in step S205, to indicate locations within the geographical region 300 where pico BSs may be most advantageously placed because relying on SINR information alone to identify pico BS placement locations may result in pico BS placement locations that raise low SINR values without providing much actual benefit to UEs or a macro BS which the pico BS is meant to support. For example, if UE offered traffic is not concentrated around a pico BS, or UEs are biased to connect to a macro BS instead, the benefit of pico BSs in terms of carried traffic may be minimal, where offered traffic is available traffic and carried traffic is the portion of the offered traffic that is actually handled by a BS. Accordingly, TI information provides an extra criterion which, in addition to SINR information, can be used to determine effective locations for placing pico BSs.

Figure 5:
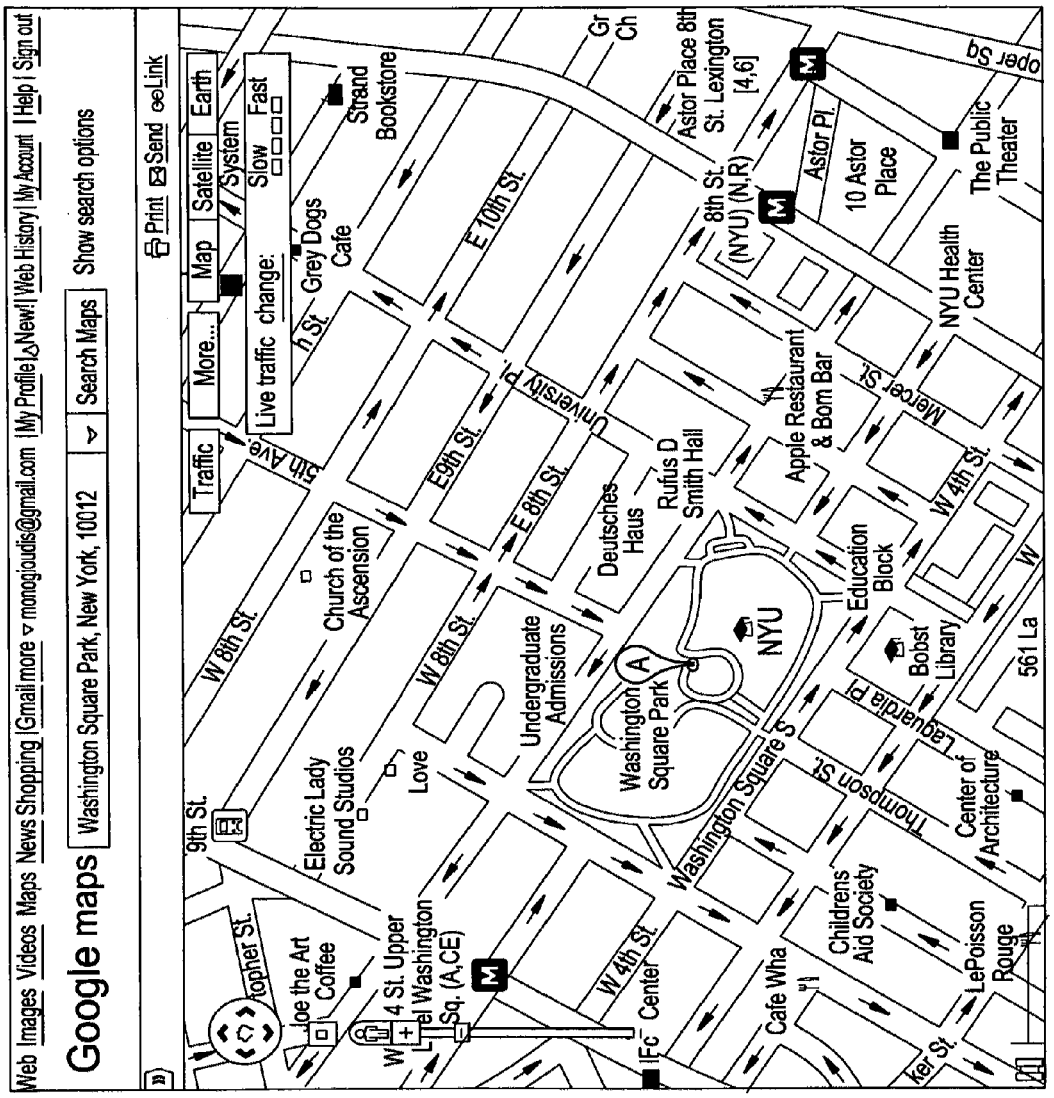
FIG. 5 is an example of a snapshot of traffic information for an urban area provided by on online map service.

TI information provides an estimation of a potential load on a network and can be determined in a number of ways. For example, many providers (not only operators but also map service providers) provide real-time as well as predicted traffic flow data. An example of a snapshot of traffic information for an urban area provided by on online map service is illustrated in FIG. 5. Referring to FIG. 5, dark lines along the roads illustrated in FIG. 5 indicate congested intersections. Traffic information like that illustrated within the snapshot in FIG. 5 may be determined based on aggregated GPS velocity information. A time series analysis of such snapshots can provide the dataset upon which Bayesian prediction methods can be applied and establish the capability of probabilistic assignment of congestion indications to each grid point.

As another method for the estimation of the potential load on a network, data that indicates congestion in the radio network can also be considered if available. TI maps from sources external to network traffic sources, like the online map service provided snap shot illustrated in FIG. 5, capture the potential load on a network. In contrast, data from a radio network itself may capture the offered as well as the carried load.

As is described above with reference to FIG. 1A. communications network 100 may include an MME. As yet another method for the estimation of the potential load on a network, an MME can be used. The number of cell reselections that UEs have made into each cell id via operations, administration and management (OA&M) interfaces included in an MME can be evaluated in order to determine TI. This number can be used to obtain hourly, daily or weekly statistics. A high number of reselections relative to average for the duration of the observation period are an indication of high TI, and thus, an indication that a corresponding location is a good candidate for one or more pico BSs. A cell reselection does take place though while the UE is idling. As is known, the possibility of capturing a cell reselection event occurs when the UE follows up with a so-called Non-Access Stratum (NAS) procedure.

In addition to the idle mode procedures discussed above, inbound and outbound traffic to a cell may be captured by monitoring signaling messages that result from mobility procedures in connected mode and when the UE has an established RRC connection with the cell. Using location based services (LBS) the location of UEs that are involved in the transmission of radio resource control (RRC) messages such as "MEASUREMENT_REPORT" messages can be extracted. Such messages are triggered in many areas that are challenging for the UEs because of the coverage or SINR. Mining "MEASUREMENT_REPORT" messages can provide both a verification of the SINR map values as well as traffic density information. The traffic intensity map can then be constructed where (x,y) coordinates designate the locations in which "MEASUREMENT_REPORT" messages were sent and the color designates the average number of connected events logged by LBS for the (x,y) grid point.

The manner in which the SINR and TI maps obtained in step S205 and S210 are used to determined potential locations for pico BSs will be now discussed in greater detail below.

Determining Candidate Placement Locations

Returning to FIG. 2, once signal strength information and UE traffic information are obtained in steps S205 and S210 in the form of, for example, SINR and TI maps, the example pico BS placement location identifying method illustrated in FIG. 2 proceeds to steps S215 and S220. In steps S215 and S220, a clustering algorithm is applied to the signal strength and traffic information obtained in step S205 and S210. An example in which steps S215 and S220 are performed using the known K-means clustering algorithm will now be discussed in greater detail below.

Figure 7:
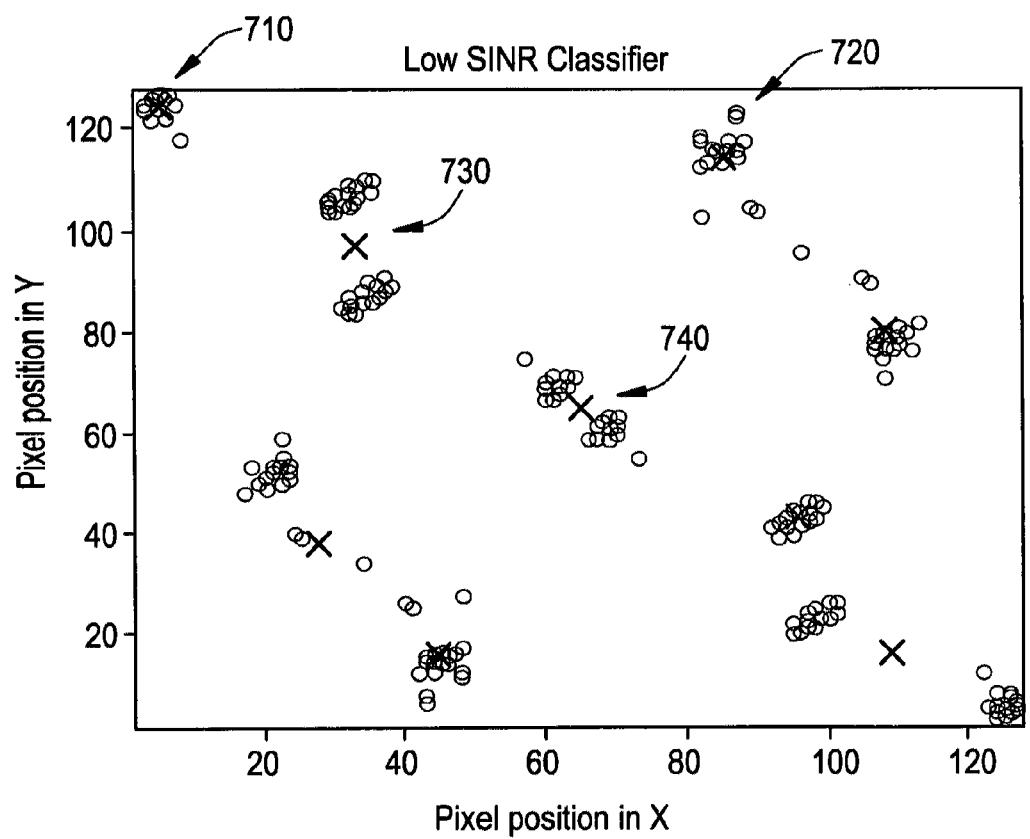
FIG. 7 illustrates a visual depiction of the output produced by applying the K-Means algorithm to the SINR data.

In step S215, the K-Means algorithm is applied to the signal strength information obtained in step S205. For example the K-Means algorithm may be applied to the SINR map 400 discussed above with reference to FIG. 4. The output of the K-Means algorithm is a list of (x,y) coordinates. FIG. 7 illustrates a visual depiction of the output produced by applying the K-Means algorithm to the SINR data 400 illustrated in FIG. 4.

In the example illustrated in FIG. 7, a version of the K-Means clustering algorithm that involves a pre-processing operation is used. In the pre-processing operation an array of all SINR map data points whose SINR values are below a threshold SINR_th is produced. The data points included in this array are represented by the circles illustrated in FIG. 7. The data points included in this array are Euclidean in nature and are effectively a number of (x,y) coordinates. The K-Means algorithm may be applied using a value K provided a-priori from a radio network planner. In the example illustrated in FIG. 7, K=10. The K-Means algorithm clusters the data points of the array determined during the pre-processing step discussed above, and identifies SINR-based centroids $C_S$ based on the clusters. The SINR-based centroids $C_S$ are represented by the dark 'X' marks shown in FIG. 7. The SINR-based centroids $C_S$ indicate desirable locations for placing a pico BS based on the SINR map data.

As one can observe in some instances of very closely low SINR values the K-Means algorithm produced candidate pico BS locations right on top of the local data cloud, as is illustrated by SINR-based centroids $C_S$ 710 and 720. In some other instances the K-Means algorithm produced candidate pico BS locations that are a compromise between two smaller cloud locations, as is illustrated by SINR-based centroids $C_S$ 730 and 740.

Returning to FIG. 2, in step S220, the K-Means algorithm is also applied to the UE traffic information obtained in step S210. For example, in step S220, the K-Means algorithm may be applied to a TI map in a manner similar to that discussed above in step S215. In particular, a version of the K-Means clustering algorithm that involves a pre-processing operation is used. In the pre-processing operation an array of all TI map data points whose traffic values are above a threshold intensity value is produced. In the same manner discussed above with reference to FIG. 7, the data points included in this array are Euclidean in nature and are effectively a number of (x,y) coordinates. The K-Means algorithm applied to the TI map data may also be applied using a K value provided a-priori from a radio network planner, for example K=10. Further, the K-Means algorithm clusters the data points of the array determined during the pre-processing step discussed above and identifies TI-based centroids $C_T$ based on the clusters. The TI-based centroids $C_T$ indicate desirable locations for placing a pico BS based on the TI map data.

Though steps S215 and S220 are described above with reference to the K-means clustering algorithm, the K-Means clustering algorithm is only one example. According to example embodiments, other clustering algorithms may be used including, for example, clustering algorithms that are able to produce better centers and borders.

Returning to FIG. 2, once SINR-based centroids $C_S$ and TI-based centroids $C_T$ are determined in steps S215 and S220, in step S225, Euclidean distances are determined between each combination of SINR-based centroids $C_S$ and TI-based centroids $C_T$. For example, a matrix D may be formed where each member of the matrix D[i, j], represents a Euclidean distance between an $i^{th}$ SINR-based centroid $C_S$ and a $j^{th}$ TI-based centroid $C_T$. For example. Matrix D may be defined according to equation (2) below.

$$D[i,j]=\|C_S(i)-C_T(j)\| \quad (2)$$

Returning to FIG. 2, after Euclidean distances are determined, candidate locations are determined in step S230. For example, in step S230, the matrix D discussed above with reference to step S225 may be evaluated in order to identify pairs of centroids ($C_S$, $C_T$) having Euclidean distances that are minimal or low distances as the candidate locations. Centroid pairs having Euclidean distances that are minimal or low, represent locations within geographical region 300 where both low SINR and high TI values exist. Accordingly, centroid pairs having minimal or low Euclidean distances represent optimal or desirable locations for placing a pico BS in order to achieve both goals of increasing low signal strength and handling high UE traffic simultaneously. The manner in which the candidate locations are evaluated in order to select one of the candidate locations as a placement location for pico BS will now be discussed in greater detail below.

Choosing a Pico BS Placement Location

Returning to FIG. 2, once candidate locations are determined in step S230, in step S235 one of the candidate locations determined in step S230 is chosen as a placement location of a pico BS. In step S235, pull-in capacity values are determined for each of the candidate locations in order to determine the potential impact of each candidate location. As will be discussed in greater detail below, for each candidate location, the corresponding pull-in capacity value is an indication of the efficiency with which a pico BS placed at the candidate location would serve UEs in communications network 100. The pico placement location is chosen from among the candidate locations based on the pull-in capacity values. An example method for performing step S235 will now be discussed in greater detail with reference to FIG. 6.

Figure 6:
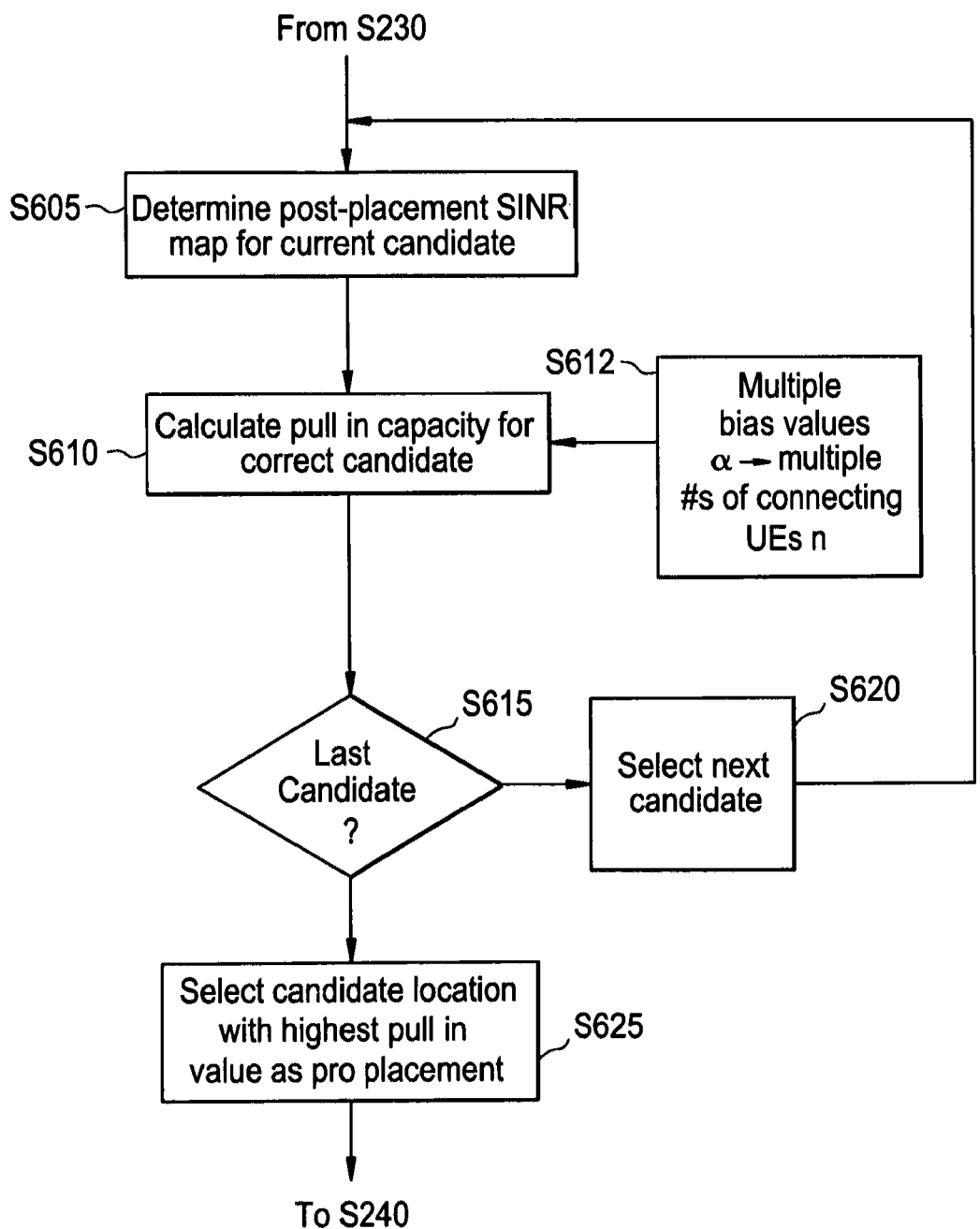
FIG. 6 is a flow chart illustrating an example method for performing step S230 in FIG. 2.

Referring to FIG. 6, in step S605, a post placement SINR map is determined for a first one of the candidate locations determined in step S230. Once a pico BS is actually placed within geographical regions 300, a SINR map for the geographical region 300 will likely change due to the impact of the placed pico BS. Accordingly, the post placement SINR map is an estimated SINR map that is determined based on the assumption that a pico BS is placed at the current candidate location.

For example, in order to create the post selection SINR map, a vector of post-selection SINR values is produced around a selection radius corresponding to the first candidate location. The selection radius is a radius around a BS within which UEs will choose to connect to the BS. The value n represents the number of UEs within the selection radius, or the number of UEs that will choose to connect to a pico BS if placed at the candidate location. The number of connecting UEs n may be determined based on, for example, a selection bias α. The selection bias will now be discussed in greater detail below with reference to FIG. 8.

Figure 8:
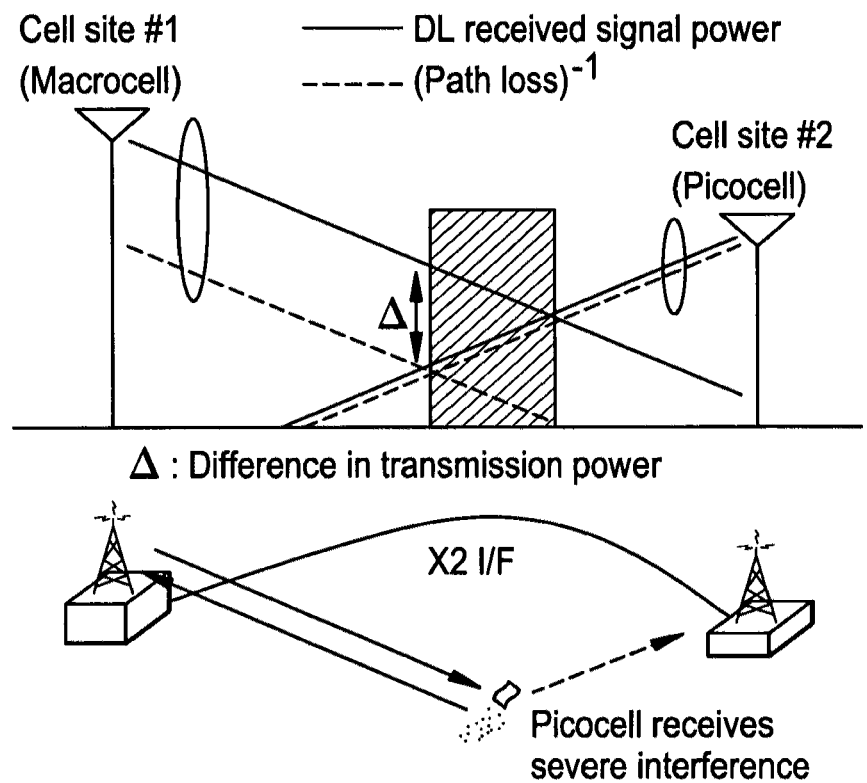
FIG. 8 is a diagram illustrating an example transmission power difference between a macro cell and a pico cell.

FIG. 8 is a diagram illustrating an example transmission power difference between a macro cell and a pico cell. Conventionally a UE will select which of a macro BS and a pico BS to connect to based on a comparison of the respective reference signal received power (RSRP) values of the macro and pico BSs in the manner defined by equation (3) below:

$$CellID_{serving}=\arg\max_{\{i\}}\{RSRP_i\} \quad (3)$$

wherein CellID$_{serving}$ represents the cell a UE chooses to connect to. As FIG. 8 illustrates, macro cells have greater transmission power than pico cells. The interaction between macro cells and pico cells creates shrinkage of the coverage of the pico cells and asymmetry in the quality of the uplink versus the downlink. Accordingly, R8 specifications, for example, allow a bias in the selection process between macro and pico BSs that can range from 0 to 20 dB. Equation (4) below illustrates equation (3) modified to incorporate an RSRP bias value α.

$$CellID_{serving}=\arg\max_{\{i\}}\{RSRP_i+\alpha_i\} \quad (4)$$

The incorporation of the bias value α effectively increases the range of an associated pico BS at the expense of DL SINR when a radio resource control (RRC) connection establishment is attempted.

Accordingly, one example definition of the number of connecting UEs n is represented by equation (5) below:

$$n = \lceil \rho_{TT}(\text{sq km of normal coverage of pico BS})\rceil \cdot (F_\alpha) \quad (5)$$

where the value $\rho_{TT}$ represents a number of UEs per square kilometer and may be determined based on the traffic information obtained in step S210, and the value $F_\alpha$ represents a range increase of a pico BS as a function of the selection bias value α. Those having knowledge in the art recognize that the value $F_\alpha$ can be calculated with the use of a look up table, using as inputs link budget parameters and the selection bias value α, according to known methods. For example, the value $F_\alpha$ may be defined according to equation (6) below:

$$F_\alpha = g(\alpha, \text{link budget parameters}) \quad (6)$$

where the function g(x) represents a function mapping the value $F_\alpha$ to link budget parameters and a selection bias value α.

The post-selection SINR values produced in step S605 are not the same SINR values produced as discussed above with reference to step S205. The post-selection SINR values are SINR values that are calculated assuming that a pico BS is placed at the candidate location, and the n UEs inside the cell selection radius around pico BS truly connect to the pico BS.

Figure 9:
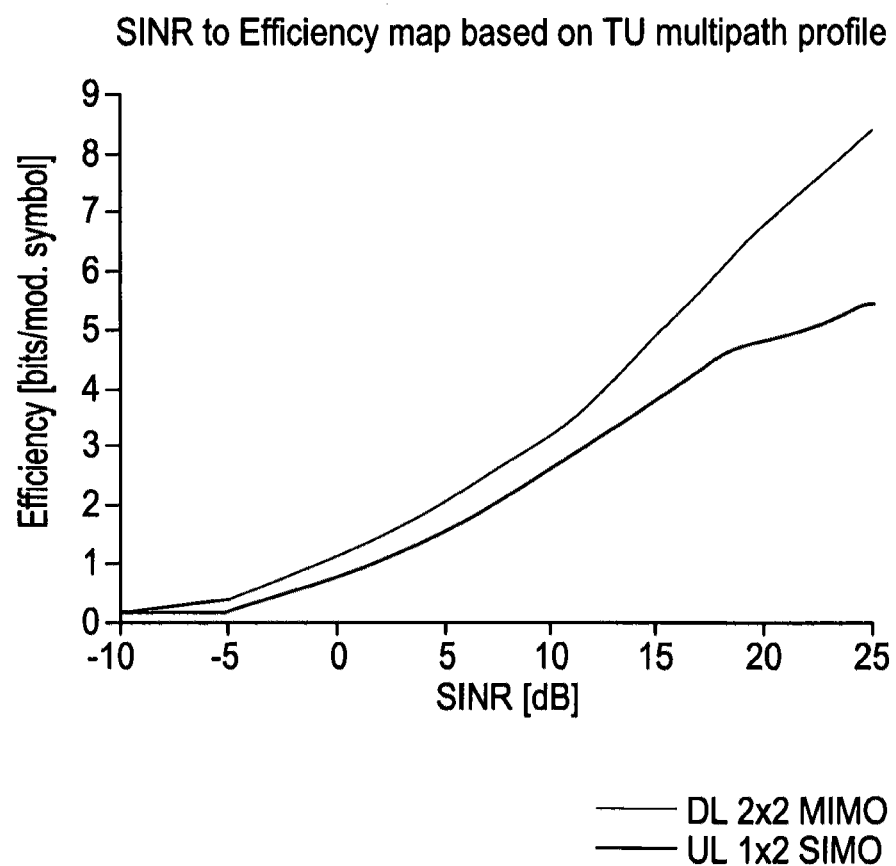
FIG. 9 is a graph illustrating an example of a function that maps the post-placement SINR to a data rate.

After the post placement SINR map is determined for the current candidate location in step S605, a pull-in capacity value C_pi is determined for the current candidate location in step S610. The pull-in capacity value C_pi may be represented by equation (7) below:

$$C\_pi = \text{sum}\_n\, f(\text{SINR}\_pp(n)) \quad (7)$$

where the summation is over the number of UEs n and f(x) is a function that maps the post-placement SINR to a data rate according to known methods. FIG. 9 is a graph illustrating an example of a function that maps the post-placement SINR to a data rate. The function f(x) may incorporate data rate (spectral efficiency) limits imposed by the radio interface modulation and coding schemes, penalty values due to implementation and other factors related to the antenna configuration of the pico BS located at the candidate location.

As is stated above, the number of connecting UEs n is based on the selection bias α. The selection bias α is a variable value which may be set according to the preferences of a network operator.

As an alternative to using a set bias value α in step S610, multiple bias values α can be used to determine capacity values for each candidate location. As is discussed above, each bias value α may correspond to a different number of connecting UEs n, resulting in a different capacity values C_pi for the same candidate location. Accordingly, as an optional operation, in step S610, pull-in capacity values C_pi may be determined for multiple selection bias values α in order to select a bias value α that results in a desirable or optimal capacity value C_pi. The optional operation of conducting step S610 using, as input, multiple potential values for the bias α is represented by input 612. Bias value α optimization will now be discussed in greater detail below.

Depending on the determined bias value α, a distinct number of UEs represented by the number of connecting UEs n will be "pulled in" into the pico BS and necessarily pushed out of the overlaid macro BS. Where to stop the expansion of the pico selection radius must be determined based on the pull-in capacity benefit to the pico BS as well as the push-out capacity benefit of the overlaid macro BS.

This determination is desirably made taking into account the following tradeoffs. The pico BS pulls in UEs that otherwise connect to the macro BS with a post-selection SINR that is directly related to the bias value α. At small values of bias the sum capacity of the pico BS and the macro BS suffers since there are not enough UEs connecting to the pico BS and the macro BS is overloaded. The higher the bias value α becomes, the greater the number of UEs that select the pico BS becomes. However, the selected UEs have worse and worse post-selection SINR. Therefore the pico pull-in capacity benefit flattens out as the bias value α increases. On the other hand, for moderate levels of the bias value α the macro BS pushes out UEs freeing resources that are redistributed to the macro BSs remaining UEs, boosting the macro BSs cell throughput (Tput) as well as the average UE Tput in the macro BSs coverage. However, at high levels of the bias value α, the post-selection SINR of the UEs that are pulled-in to the pico BS is so bad that the pull-in capacity is effectively unchanged. System capacity suffers since the UEs are effectively leaving the macro BS to experience, at a pico BS, far worse SINRs than they had.

Accordingly, for each candidate location, it may desirable to choose a bias value α that increases or maximizes the pull-in capacity value C_pi discussed above with respect to equation (7).

Once the pull-in capacity value C_pi is determined for the first candidate location, in step S615 it is determined whether the last of the candidate values determined in step S230 has been evaluated. If not, in step S620, the next candidate location is selected and the example pico placement location identifying method illustrated in FIG. 2 returns to step S605. This way, steps S605-S610 are completed for each of the candidate locations determined in step S230.

If, in step S615, it is determined that the final candidate location has been evaluated, in step S625 the candidate location with the highest pull-in capacity value C_pi, out of all the candidate locations values, is selected as the pico placement location. If step S610 was performed using a set or reference selection bias value α, then the candidate location selected in step S625 is the candidate location having highest capacity values of all capacity values calculated for all candidate locations. If step S610 was performed using, as input, multiple potential values for the bias α612 in the manner discussed above, then the candidate location selected in step S625 is the candidate location having highest capacity values of all capacity values calculated for all candidate locations using each of the multiple potential bias values α612.

Returning to FIG. 2, once a pico placement location is chosen in step S235, it is determined whether or not any more pico placement locations need to be determined based on the desired number of pico BSs Np.

In step S240, an index value N, which may be, for example, a real positive integer initialized at the value N=1, is incremented. Next, in step S245, the index value N is compared to the desired number of pico BSs Np. If, in step S245 it is determined that the index value N is not greater than the desired number of pico BSs value, Np, then a number of pico BS locations equal to the desired number of pico BS locations Np has not yet been determined. Accordingly, the method illustrated in FIG. 2 proceeds to step S250.

In step S250, the SINR. map obtained in step S205 is updated taking into account the SINR changes that will result from the existence of a pico BS at the pico placement location determined in step S235. Afterwards, steps S215~S245 are completed again in order to determine a new pico BS placement location. Steps S215–S245 are completed for each individual pico BS placement location until Np pico BS placement locations have been determined. For each iteration of step S250, a SINR map may be produced which takes into account SINR changes that will result from the existence pico BSs at locations determined for all previous iterations of step S235.

If, in step S245, the index value N is greater than the desired number of pico BS placement locations Np, the desired number of pico placement locations have been determined and the method illustrated in FIG. 2 is completed.

Accordingly, the method illustrated in FIG. 2 may be completed in an automated manner to place any number, Np, of pico BSs in such a manner that each pico location is chosen to achieve both a desirable increase in SINR for low-SINR areas, and a desirable decrease in the number of UEs connecting to a macro BS, in high traffic areas.

Once the pico BS placement location identifying method according to example embodiments of the present invention is completed, a network operator can construct pico BSs at the one or more desirable or optimal pico BS locations identified by the method. Because the pico BS placement location identifying method according to example embodiments uses both signal strength and traffic information when choosing pico BS placement locations, a network operator can use the method to place one or more pico BSs in geographical locations within the coverage area of a macro BS manner which allows the placed pico BSs to both increase low signal strength values, and shift UEs from the macro BS in areas where UE traffic is high. Accordingly, when attempting to determine locations for placing pico BSs in a geographical region including a macro BS, a network operator can use pico BS placement location identifying method according to example embodiments of the present invention to identify pico BS locations within the geographical region which increase the service quality of individual UEs while reducing the potential for overloading the macro BS.

Further, the because pico BS placement location identifying method according to example embodiments of the present invention may be automated, the method is scalable, and a network operator may use the method both relatively small numbers of pico BS, for example 5, and a relatively high numbers of pico BSs, for example 100, without significant increase in the amount of effort or human input required by the network operator.

Embodiments of the invention being thus described, it will be obvious that embodiments may be varied in many ways. Such variations are not to be regarded as a departure from the invention, and all such modifications are intended to be included within the scope of the invention.

What is claimed:

1. A method for determining one or more locations within a geographical region for deploying a network element of a communications network, the method comprising:
    obtaining mobile device traffic information associated with the geographical region;
    obtaining signal strength information associated with the geographical region;
    determining a plurality of candidate locations based on the traffic information and the signal strength information, using a network planning device;
    determining capacity values for each of the candidate locations, using the network planning device; and
    selecting a candidate location, from among the plurality of candidate locations, as a placement location for the network element based on the capacity values, using the network planning device,
    wherein the determining the plurality of candidate locations includes,
        applying a clustering algorithm to the signal strength information to generate a first set of locations,
        applying a clustering algorithm to the traffic information to generate a second set of locations, and
        selecting the plurality of candidate locations based on the first and second generated sets of locations, and
    wherein the selecting the plurality of candidate locations based on the first and second generated sets of locations includes,
        determining a plurality of distance values based on Euclidean distances between each of the first set of generated location values, and each of the second set of generated location values, and
        selecting, as the plurality of candidate locations, location values from among the first and second sets of generated location values based on the plurality of distance values.

2. The method of claim 1, wherein the signal strength information is a signal to interference and noise ratio (SINR) map.

3. The method of claim 1, wherein the traffic information is a traffic intensity (TI) map.

4. The method of claim 1, wherein the determining capacity values for each of the candidate locations includes determining post selection SINR values corresponding to each of the candidate locations.

5. The method of claim 4, wherein each of the post selection SINR values is based on an estimated number mobile devices which will connect to a network element that is placed at the candidate location corresponding to the SINR value.

6. The method of claim 5, wherein the estimated number of mobile devices is determined based on the traffic information and a bias value, the bias value being a value which controls the likelihood with which a mobile device that is in a portion of the geographical region within a coverage area of a macro base station and a pico base station will connect to the pico base station.

7. The method of claim 6, wherein the determining capacity values for each of the candidate locations includes determining, for each candidate location, a plurality of potential capacity values, each of the plurality of potential capacity values corresponding to a different one of a plurality of potential bias values.

8. The method of claim 1, wherein the selecting a candidate location, from among the plurality of candidate locations, as a placement locations based on the capacity values comprises:
    choosing the candidate location, from among the plurality of candidate locations, having the highest associated pull-in capacity.

9. The method of claim 8, wherein the selecting a candidate location, from among the plurality of candidate locations, as a placement locations based on the capacity values further comprises:
    choosing the candidate location, from among the plurality of candidate locations, having the highest associated pull-in capacity, from among each pull-in capacity in each plurality of potential capacity values corresponding to each of the plurality of candidate locations.

10. The method of claim 1, wherein the network element is a pico base station.

11. The method of claim 10, wherein the pico base station is underlaid with respect to a macro base station in the geographical region.

12. A network planning device configured to determine one or more locations within a geographical region for deploying a network element of a communications network, the device comprising:
- a processor;
- a data bus; and
- a memory unit connected to the processor through the data bus, the memory storing instructions configured to cause the processor to
  - obtain mobile device traffic information associated with the geographical region,
  - obtain signal strength information associated with the geographical region,
  - determine a plurality of candidate locations based on the traffic information and the signal strength information,
  - determine capacity values for each of the candidate locations, and
  - select a candidate location, from among the plurality of candidate locations, as a placement location for the network element based on the capacity values,
- wherein the instructions are configured to cause the processor to determine the plurality of candidate locations by
  - applying a clustering algorithm to the signal strength information to generate a first set of locations,
  - applying a clustering algorithm to the traffic information to generate a second set of locations, and
  - selecting the plurality of candidate locations based on the first and second generated sets of locations, and
- wherein the instructions are configured to cause the processor to select the plurality of candidate locations based on the first and second generated sets of locations by
  - determining a plurality of distance values based on Euclidean distances between each of the first set of generated location values, and each of the second set of generated location values, and
  - selecting, as the plurality of candidate locations, location values from among the first and second sets of generated location values based on the plurality of distance values.

13. The device of claim 12, wherein the signal strength information is a signal to interference and noise ratio (SINR) map.

14. The device of claim 12, wherein the traffic information is a traffic intensity (TI) map.

15. The device of claim 12, wherein the determining capacity values for each of the candidate locations includes determining post selection SINR values corresponding to each of the candidate locations.

16. The device of claim 12, wherein the network element is a pico base station that is underlaid with respect to a macro base station in the geographical region.

17. A method for determining one or more locations within a geographical region for deploying a network element of a communications network, the method comprising:
- obtaining mobile device traffic information associated with the geographical region;
- obtaining signal strength information associated with the geographical region;
- determining a plurality of candidate locations based on the traffic information and the signal strength information, using a network planning device;
- determining capacity values for each of the candidate locations, using the network planning device; and
- selecting a candidate location, from among the plurality of candidate locations, as a placement location for the network element based on the capacity values, using the network planning device,
- wherein the determining capacity values for each of the candidate locations includes determining post selection SINR values corresponding to each of the candidate locations,
- wherein each of the post selection SINR values is based on an estimated number mobile devices which will connect to a network element that is placed at the candidate location corresponding to the SINR value, and
- wherein the estimated number of mobile devices is determined based on the traffic information and a bias value, the bias value being a value which controls the likelihood with which a mobile device that is in a portion of the geographical region within a coverage area of a macro base station and a pico base station will connect to the pico base station.

* * * * *